(12) United States Patent
Balasubramanian

(10) Patent No.: US 9,026,866 B2
(45) Date of Patent: May 5, 2015

(54) METHOD AND SYSTEM FOR REALTIME DETECTION OF STACK FRAME CORRUPTION DURING NESTED PROCEDURE CALLS

(75) Inventor: Prakash Kalanjeri Balasubramanian, Bangalore (IN)

(73) Assignee: Infineon Technologies AG, Neubiberg (DE)

(*) Notice: Subject to any disclaimer, the term of this patent is extended or adjusted under 35 U.S.C. 154(b) by 285 days.

(21) Appl. No.: 13/453,136

(22) Filed: Apr. 23, 2012

(65) Prior Publication Data

US 2013/0283105 A1    Oct. 24, 2013

(51) Int. Cl.
| G06F 11/00 | (2006.01) |
| G06F 9/44  | (2006.01) |
| G06F 11/07 | (2006.01) |
| G06F 11/36 | (2006.01) |

(52) U.S. Cl.
CPC .......... *G06F 11/3648* (2013.01); *G06F 9/4426* (2013.01); *G06F 11/073* (2013.01); *G06F 11/0751* (2013.01); *G06F 11/0772* (2013.01); *G06F 11/0775* (2013.01); *G06F 11/3624* (2013.01); *G06F 11/3636* (2013.01)

(58) Field of Classification Search
CPC ............ G06F 11/3644; G06F 11/3648; G06F 11/0751; G06F 11/0772; G06F 11/073; G06F 11/3636; G06F 11/3624
See application file for complete search history.

(56) References Cited

U.S. PATENT DOCUMENTS

| 4,751,667 | A | 6/1988 | Ross |
| 6,578,094 | B1 * | 6/2003 | Moudgill ........................ 710/57 |
| 6,769,116 | B1 | 7/2004 | Sexton |
| 7,086,088 | B2 | 8/2006 | Narayanan |
| 7,272,748 | B1 | 9/2007 | Conover et al. |
| 7,334,112 | B2 * | 2/2008 | Zahir et al. ..................... 712/220 |
| 7,380,245 | B1 | 5/2008 | Lovette |
| 7,631,249 | B2 | 12/2009 | Borde et al. |
| 8,104,021 | B2 * | 1/2012 | Erlingsson et al. ........... 717/126 |
| 2007/0285271 | A1 * | 12/2007 | Erlingsson et al. ...... 340/815.84 |
| 2008/0148399 | A1 | 6/2008 | Winkler |

OTHER PUBLICATIONS

ARM 7TDMI Data Sheet. Chapter 8. 31 pages.
U.S. Appl. No. 13/184,999, filed Jul. 18, 2011.
Office Action Dated Jun. 21, 2013 U.S. Appl. No. 13/184,999.
Final Office Action Dated Nov. 12, 2013 U.S. Appl. No. 13/184,999.
Notice of Allowance Dated Sep. 12, 2014 U.S. Appl. No. 13/184,999.

* cited by examiner

*Primary Examiner* — Michael Maskulinski
(74) *Attorney, Agent, or Firm* — Eschweiler & Associates, LLC

(57) ABSTRACT

The present disclosure relates to some aspects relate to a method for detecting stack memory corruption. In some embodiments, the method comprises determining an expected memory range of a data element that is to be written to a stack memory by tracking changes to a stack pointer. The determined memory range is stored in a stack object database. Upon receiving a stack memory access related instruction (e.g., LOAD/STORE instruction or arithmetic instruction operating on memory addresses) to write data to the stack memory, an address of the memory location to be accessed is determined. If the address falls within the expected memory range, no stack corruption is present. However, if the address falls outside of the expected memory range, stack corruption is present. Therefore, the present method provides for real time detection of corruption (e.g., overrun and underrun errors) in stack memory.

16 Claims, 8 Drawing Sheets

800 ↘

MOV SP,#2000 -> (1) => Results in activation of Initialize SP signal ← 804

SUB SP,#4 -> (2) => Results in activation of "Update Entry" signal ← 806

....
SUB SP,#1 -> (3) ← 808

....
SUB SP,#1 -> (4)

....
SUB SP,#2 -> (5)

802a ↘

Stack Object file during PUSH operations

| Before (1) | After (1) | After (2) | After (3) | After (4) | After (5) |
|---|---|---|---|---|---|
| Inaccessible | 0 | 1996 | 1996 | 1996 | 1996 |
| Inaccessible | 0 | 1999 | 1999 | 1999 | 1999 |
| Inaccessible | 0 | 0 | 1995 | 1995 | 1995 |
| Inaccessible | 0 | 0 | 1995 | 1995 | 1995 |
| Inaccessible | 0 | 0 | 0 | 1994 | 1994 |
| Inaccessible | 0 | 0 | 0 | 1994 | 1994 |
| Inaccessible | 0 | 0 | 0 | 0 | 1992 |
| Inaccessible | 0 | 0 | 0 | 0 | 1993 |
| | SP = 2000 | SP = 1996 | SP = 1995 | SP = 1994 | SP = 1992 |

Stack Object file during POP operations

ADD SP,#2 -> (6) => Results in activation of "Remove Entry" signal ← 802b

....
ADD SP,#1 -> (7)

....
ADD SP,#1 -> (8)

....
ADD SP,#4 -> (9)

| After (6) | After (7) | After (8) | After (9) |
|---|---|---|---|
| 1996 | 1996 | 1996 | 0 |
| 1999 | 1999 | 1999 | 0 |
| 1995 | 1995 | 0 | 0 |
| 1995 | 1995 | 0 | 0 |
| 1994 | 0 | 0 | 0 |
| 1994 | 0 | 0 | 0 |
| 0 | 0 | 0 | 0 |
| 0 | 0 | 0 | 0 |
| SP = 1994 | SP = 1995 | SP = 1996 | SP = 2000 |

Fig. 8

METHOD AND SYSTEM FOR REALTIME DETECTION OF STACK FRAME CORRUPTION DURING NESTED PROCEDURE CALLS

BACKGROUND

Electronic memory is used in computer systems and electronic devices to store data, programs, and the like. The integrity of the memory is important for operation of the computer systems and/or devices associated with the memory. For example, if memory is corrupted data stored in the memory may be lost or programs stored in the memory may execute incorrectly or not at all.

Buffer overrun errors and underrun errors are common causes of memory corruption. Buffer overrun and underrun errors are conditions wherein a software program writes beyond the boundaries of a memory buffer block, leading to corruption of adjacent memory blocks. The effects of buffer overrun and underrun are unpredictable. In some cases, the effects show up immediately in the form of a CPU fault and in some cases the corruption is so subtle that it simply goes undetected for long periods of time.

BRIEF DESCRIPTION OF THE DRAWINGS

FIG. 3b illustrates a flow diagram showing some embodiments of an exemplary data flow within the stack corruption detection system of FIG. 3a.

FIG. 8 is a diagram illustrating exemplary high level programming code and corresponding operation of a stack object database during PUSH and POP operations.

DETAILED DESCRIPTION

Figure 1:
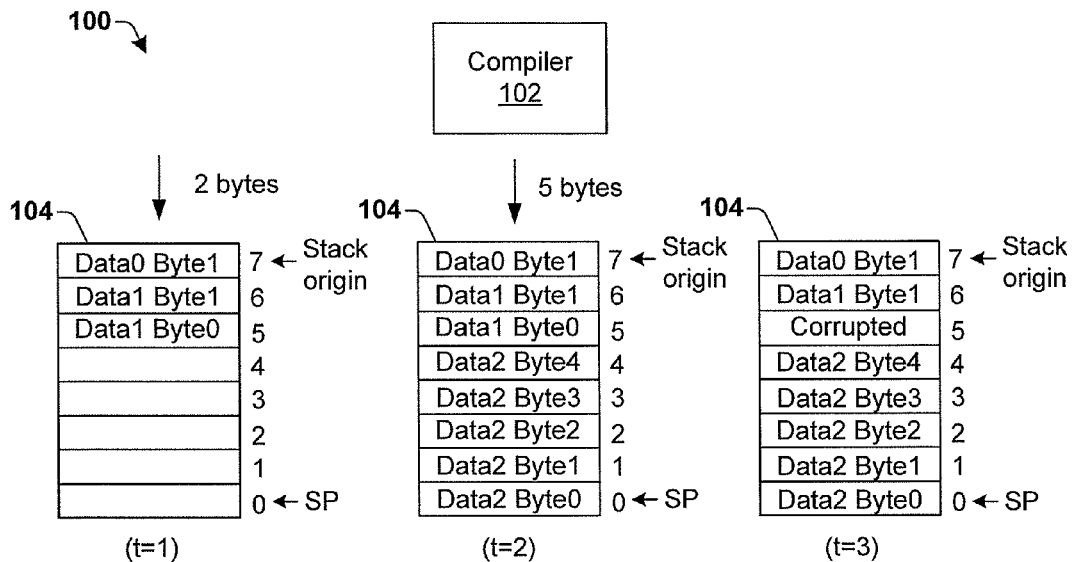
FIG. 1 illustrates a block diagram of a stack memory undergoing a buffer overrun error.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one skilled in the art, that one or more aspects described herein may be practiced with a lesser degree of these specific details. In other instances, known structures and devices are shown in block diagram form to facilitate understanding.

It will be appreciated that in the disclosure provided below, a PUSH instruction and a STORE instruction refer to a same operation so that the terms 'PUSH' and 'STORE' may be used interchangeably. Similarly, a POP instruction and a LOAD refer to the same operation, so that the terms 'POP' and 'LOAD' may be used interchangeably without providing a different meaning.

During operation, a software program utilizes stack memory to store local variables of its procedures. Stack memory is a linear data structure that operates as a last in, first out (LIFO) storage. This means that data is stored in stack memory by allocating a block of memory locations (e.g., 32 memory bytes) and then filling the allocated memory locations with data elements (e.g., a 4 byte data element, an 8 byte data element, and a 20 byte data element) in a manner such that the most recently filled memory locations are the next memory locations to be freed (i.e., new storage is allocated and deallocated at a 'top' of the stack). Since stack memory has an enforced pattern of allocation and deallocation (unlike heap memory, wherein blocks of memory are allocated and freed in an arbitrary order), keeping track of the stack can be done by adjusting a stack pointer, which points to a last allocated memory location.

Buffer overruns and underruns are the most common ways in which stack memory is corrupted. A buffer overrun occurs when data is written beyond the bounds of allocated memory, causing corruption of adjacent memory. FIG. 1 illustrates a block diagram of a stack memory undergoing a buffer overrun. As shown in FIG. 1, a conventional compiler 102 is operated to generate code that allocates free memory locations within a stack memory 104 by programming a stack pointer (SP) to have a new value. The memory locations are allocated by programming a stack pointer (SP) to have a new value. For example, seven memory locations are allocated by deducting seven locations from the original location of the stack pointer (i.e., by moving the stack pointer from its origin at memory location 7 to memory location 0).

In order to store in the allocated space, a STORE instruction is executed to read data from a register into the stack memory. For example, compiler 102 generates code that includes STORE instructions to read data from register and store the same into the stack memory. At a first time (t=1), the code determines a stack pointer origin at a memory location used last (e.g., memory location 7). The code decrements the stack pointer by 7 bytes. The code then operates to store a first data set (Data1) comprising 2 bytes in stack memory 104. The first data set is stored by reading data from a register and storing the read data in the allocated memory locations by way of a STORE instruction. At a second time (t=2), the code operates to store a second data set (Data 2) comprising 5 bytes in stack memory 104. The second data set is also stored by reading data from a register and storing the read data in allocated memory locations by way of a STORE instruction.

At a third time (t=3) the code operates to update Byte4 within the second data set (Data2). To reach the memory location storing Byte4 of the second data set (Data2), the code adds an offset of 4 to the base address of the second data set (Data2 Byte0). However, an error within the code assumes that Byte4 is at a location having an offset of 5 from the base address. Since the byte located at an offset of 5 is not part of the second data set (Data2), the code erroneously writes beyond stipulated size of Data2 (i.e. 5 bytes) and a buffer overrun occurs, causing Byte0 within the first data set (Data 1) to be corrupted. Underrun errors may similarly occur when code starting from a last location of a data set, subtracts an offset value larger than the size of the data set.

Stack memory corruption can be very difficult to detect using state of the art techniques since stack memory locations allocated to local data of a program procedure are based on the context that the program procedure is invoked in.

Accordingly, some aspects of the present disclosure provide for a method and apparatus to detect stack memory corruption by determining expected data characteristics of a memory access operation based upon changes to a stack pointer location and subsequently comparing the expected characteristics to actual characteristics of the memory access operation. In some embodiments, the method comprises determining an expected memory range of a data element that is to be accessed within a stack memory by tracking changes to stack pointer. The determined memory range is stored in a stack object database. Upon receiving a stack memory access related instruction (e.g., LOAD/STORE instruction or arithmetic instruction operating on memory addresses) to access the stack memory, an address of the memory location to be accessed is determined. If the address falls within the expected memory range stored in the database, no stack corruption is present. However, if the address falls outside of the expected memory range, stack corruption is present. Therefore, the present method provides for real time detection of corruption (e.g., overrun and underrun errors) in stack memory.

Figure 2A:
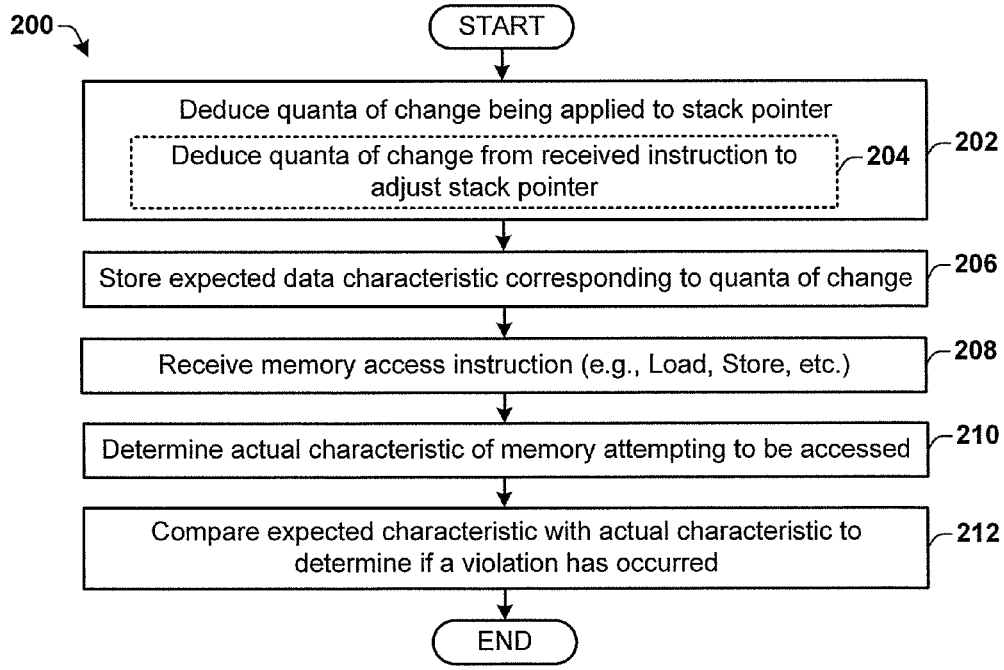
FIG. 2a illustrates a flow diagram of a method for detecting stack memory corruption.

FIG. 2a illustrates a flow diagram of a method 200 for detecting stack memory corruption.

At 202 a quanta of change being applied to the stack pointer is determined. The quantum of change applied to the stack pointer is indicative of the size of data to be written to and/or read from the stack memory. For example, if a data element of 20 bytes is to be pushed into a stack memory, then stack pointer will change by 20 bytes and it can be determined that 20 bytes are going to be pushed into the stack memory.

In some embodiments, the method may determine changes to a stack pointer by receiving an instruction to adjust a stack pointer by a value equal to the size of data to be accessed. The instruction to adjust the stack pointer can be an instruction to increment or decrement the stack pointer. For example, for descending stacks, decrementing a stack pointer can be construed as an action that indicates an imminent PUSH operation, while incrementing the stack pointer can be construed as a follow up action of a recently executed POP operation. For ascending stacks, decrementing the stack pointer can be construed as a follow up action of a recently executed POP operation, while incrementing a stack pointer can be construed as an action that indicates an imminent PUSH operation.

At 204 an expected data characteristic corresponding to the quanta of change is stored in a database. The expected data characteristic may comprise a memory range of a data element being pushed into the stack memory. For example, the data characteristic may comprise a starting address and an ending address of a data element being pushed into a stack, a starting address and a size of a data element being pushed into the stack, or some other similar quantity indicative of a change in the stack pointer location. In some embodiments, the expected data characteristic is stored in a stack object file comprising a plurality of registers configured to store entries for each data element written to the stack memory. For example, a first register may store a starting address and a second register may store an ending address.

At 206 the method receives an instruction to access the stack memory (i.e., a stack memory access instruction). The memory access instruction may comprise an instruction to store data (e.g., memory content update, a PUSH command) or an instruction to read/remove data (e.g., a load command, a POP command).

At 208 an actual data characteristic of memory attempting to be accessed is determined. In some embodiments, the actual data characteristic may comprise an address of memory attempting to be accessed by the stack memory access instruction.

At 210 the expected data characteristic is compared to the actual data characteristic. If the actual data characteristic corresponds to the expected data characteristic, it indicates that access is legitimate for a data element being accessed. However, if the actual and expected data characteristics do not correspond, it indicates that access of the data element is in violation of its data characteristics and a corruption of an adjacent data element (not necessarily physically adjacent) is imminent. For example, a determined address may be compared with a stored memory range to determine if a violation has occurred. If the determined address is within the stored memory range, it indicates that only the intended data element is being accessed. If the determined address is not within the stored memory range, it indicates that the data element accessed is different from what was originally intended to be accessed.

Figure 2B:
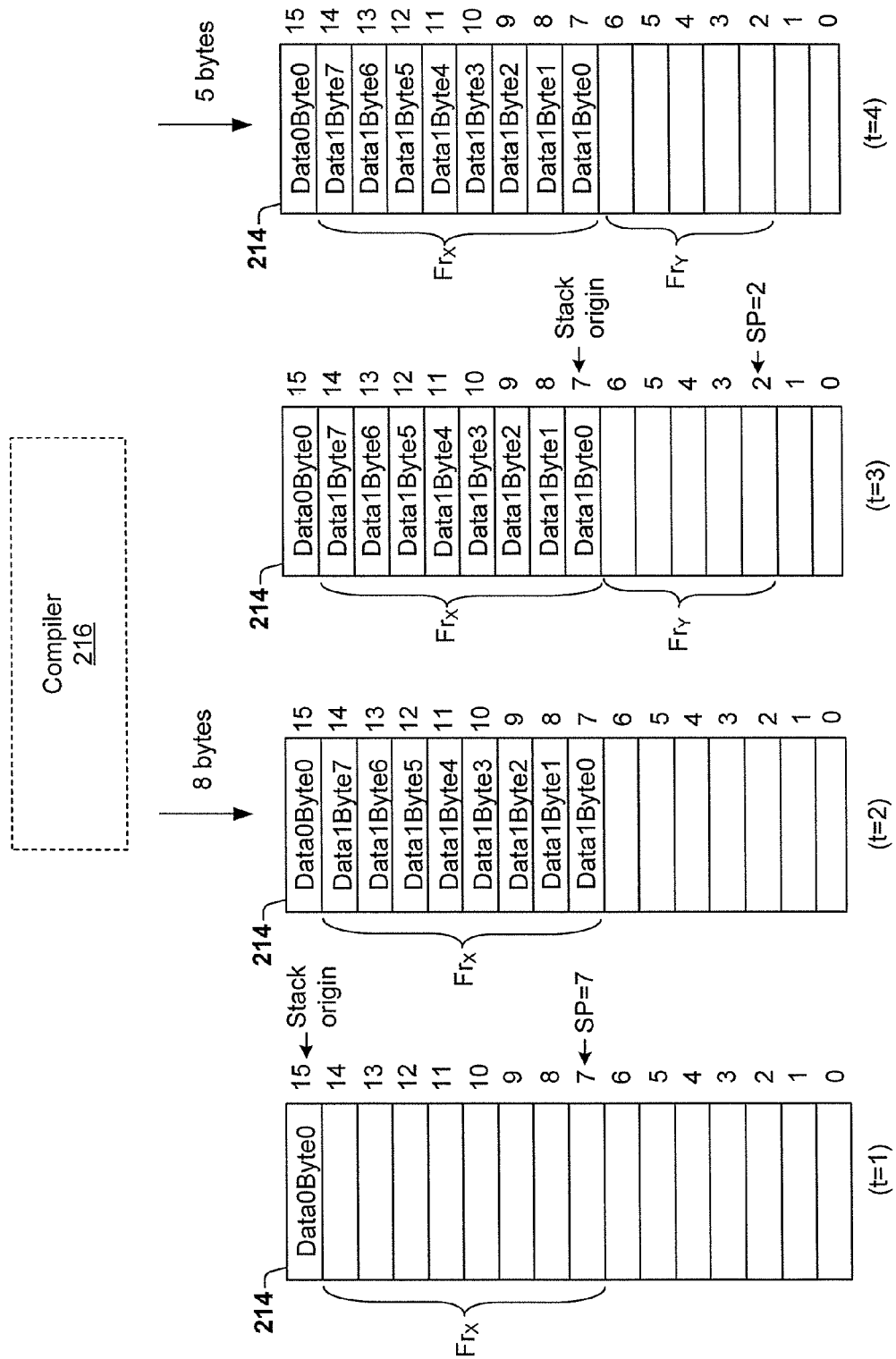
FIG. 2b illustrates a stack memory upon which a method for detecting stack memory corruption is performed.

FIG. 2b illustrates an exemplary stack memory 214 showing operation of method 200.

As shown in FIG. 2b, at a first time (t=1) code generated by a compiler 216 is configured to allocate space for a first software routine. Space is allocated by moving the location of the stack pointer (SP) from a stack origin by a value that is equal to the size of a first data element to be written. The stack pointer change is indicative that data is going to be stored in stack memory 214 having a size equal to the value of the stack pointer change. Based upon the space allocated in the stack memory 214, expected data characteristics (e.g., a starting and ending address) are written to a stack object file. For example, to allocate a first stack frame (Frame-X) having 8 memory spaces the stack pointer is moved from a stack origin at location 15 to a memory location 7. Such an allocation indicates that the first data element will be 8 bytes and start from location 7. The location and size of the data element may be written to the stack object file as a starting location of 7 and an ending location of 14.

At a second time (t=2) an instruction to write the first data element (Data1) into the stack memory 214 is received. The instruction to write the first data element into the stack memory 214 contains actual data characteristics of the first data element. Once an instruction to write the first data element is received, a comparison of the expected data characteristics to the actual data characteristics is performed to determine if a violation has occurred. For example, a command to write data from memory location 7 to 10 is compared to the start and ending location of Data1 in the stack object file. Since the expected addresses fall within the range of the actual addresses, the write command will not cause stack corruption and the first data element can be read from a register and stored in the allocated memory locations by way of a STORE instruction.

At a third time (t=3) code generated by the compiler 216 is configured to allocate space for a second software routine. For example, to allocate a second stack frame (Frame-Y) having 5 memory spaces the stack pointer is moved from a stack pointer origin at 7 to a stack pointer location at 2. Such an allocation indicates that the second data element will be 5 bytes and start from location 2.

At a fourth time (t=4) an instruction to write the second data element (Data2) into the stack memory 214 is received.

Once an instruction to write the second data element is received, a comparison of the expected data characteristics to the actual data characteristics is performed to determine if a violation has occurred. For example, a command to write data from memory location 2 to 8 is compared to the start and ending location stored in the stack object file. Since the ending memory address of the expected 5 bytes of data does not match the ending memory address of the actual 6 bytes of data to be written, the system determines that write command will cause corruption of the stack memory.

It will be appreciated that the described method can also be applied to read commands. For example, after the second data is written to the stack memory at the second time (t=2) a command to read data from memory locations 7 to 14 may be received. Upon receiving the command, data is read from the stack memory 214 and copied to one or more registers. Since the expected addresses are within the range of addresses stored for Data1, the read command is deemed as a non-corrupting access.

Figure 3A:
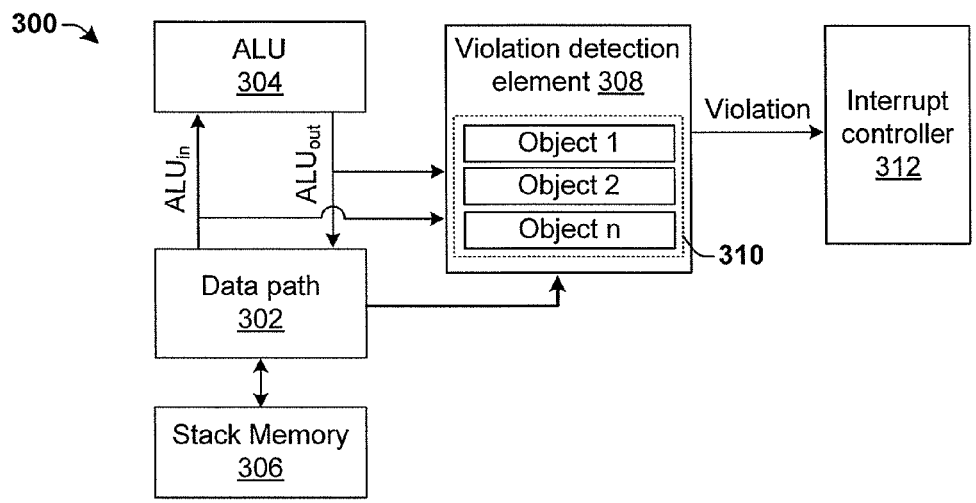
FIG. 3a is a block diagram illustrating a stack corruption detection system in accordance with some embodiments of the disclosed invention.

FIG. 3a is a block diagram illustrating a stack corruption detection system 300 in accordance with some embodiments of the disclosed invention. The system 300 is configured to track allocations of stack memory based upon stack pointer changes, and to detect stack memory corruption (e.g., overrun errors) therefrom.

The stack overrun detection system 300 comprises a datapath 302. The datapath 302 provides routes for data to travel between functional units. The datapath 302 is typically a logical concept with distributed physical implementation. It includes path(s) taken by operand data (either extracted directly from instruction or from register file) to ALU 304 or Memory access unit (Not shown in diagram). It is also includes path(s) taken to write ALU output, results or data loaded from memory back to the register file (not shown in diagram).

The datapath 302 is configured to provide an input signal $ALU_{in}$ to an arithmetic logic unit (ALU) 304. Arithmetic operations performed by the ALU 304, with a stack pointer register as an operand, will correspond to a change in a stack pointer location (top of stack location) within the stack memory 306. For example, in some embodiments a read operation increments the stack pointer while a write operation decrements the stack pointer. Such a change in the stack pointer will occur prior to execution of the actual operation (i.e., access of the actual data) being performed within the stack memory 306. For example, to store any new data on stack, first a top of stack value in a stack pointer register is modified using arithmetic instruction and then a store instruction is used with the stack pointer as an operand to actually store the data.

A violation detection element 308 is configured to receive the input signal $ALU_{in}$ and the output signal $ALU_{out}$. Based upon the input signal $ALU_{in}$, the violation detection element 308 determines a change in the stack pointer location. A data characteristic indicative of the change in stack pointer location is stored in a stack object file 310 within the violation detection element 308. In some embodiments, the data characteristic may comprise a start address and an end address of data to be written to/read from the stack memory 306. In other embodiments, the data characteristic may comprise a size of the data to be written/read, for example.

The input signal $ALU_{in}$ comprises an opcode and one or more operands. The opcode comprises instructions such as load, store, add, sub or move instructions, for example. When an arithmetic instruction involving a change to stack pointer register (i.e., the top of stack value is available in a CPU register known as stack pointer register) enters the datapath 302, the input signal $ALU_{in}$ comprises the contents of a stack pointer register (First operand) and a value that is to be deducted from the contents of the stack pointer register (Second operand). ALU 304 generates as $ALU_{out}$ the new stack pointer value. The input signal $ALU_{in}$ (Second operand) and output signal $ALU_{out}$ is provided to the violation detection element 308. The violation detection element 308 construes this as a data characteristic corresponding to the memory locations allocated within the stack memory 306.

For a memory access related instruction, the operand data comprises a base address and a size of the data object that the opcode is operating upon. The ALU 304 is configured to receive the input signal $ALU_{in}$ and based thereupon to execute an arithmetic operation. For example, the ALU 304 may add a first operand (e.g., base address) and a second operand (e.g., the offset) to determine a memory address within a stack memory 306 which is to be accessed. The ALU 304 is configured to generate an output signal $ALU_{out}$. The ALU output signal $ALU_{out}$, for example may comprise an address within stack memory whose contents must be accessed Based upon both the input signal $ALU_{in}$ and the output signal $ALU_{out}$, the violation detection element 308 determines an actual data characteristic of the memory access command. The actual data characteristic of the memory access command is compared against the expected data characteristic (determined previously by changes in the stack pointer location and stored in the stack object file 310). If the actual data characteristic of a data element corresponds to the expected data characteristic of the data element, there is no violation and the memory access does not cause corruption of data within the stack memory. However, if the actual data characteristic does not correspond to the expected data characteristic, the violation detection element 308 generates a violation signal indicating the memory access is causing corruption of data in stack memory. The violation signal is provided to an interrupt controller 312 configured to take an action in light of the corruption (e.g., to interrupt the flow of main program and execute exception handling program).

Figure 3B:
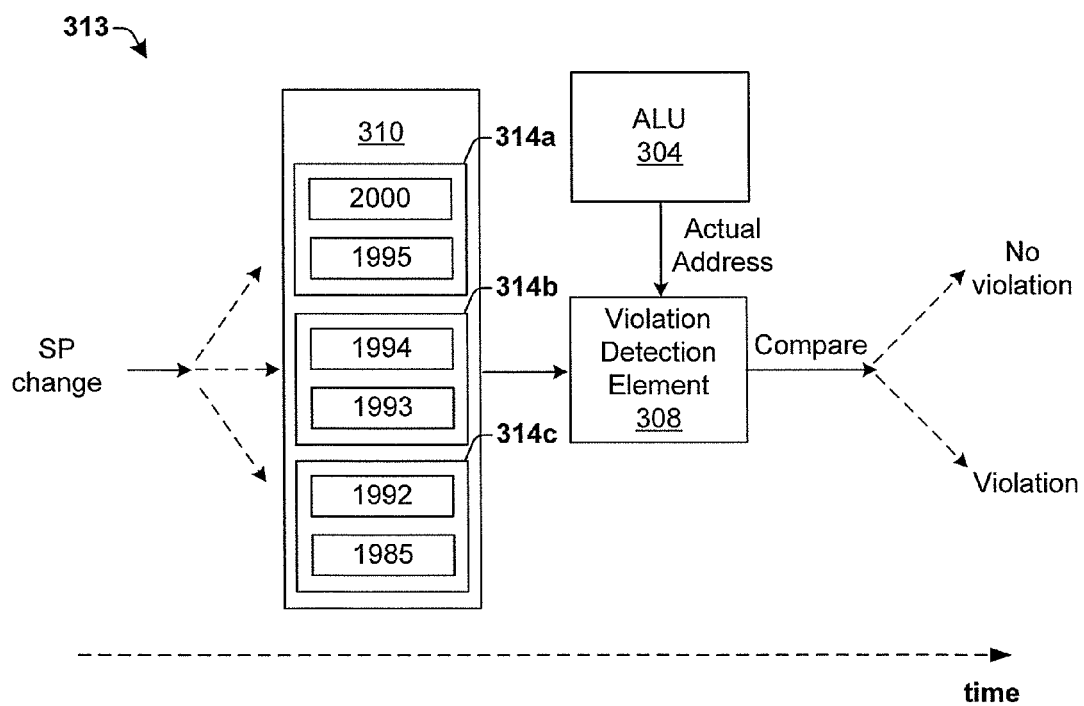

FIG. 3b illustrates a flow diagram 313 showing some embodiments of an exemplary data flow within the stack corruption detection system of FIG. 3a.

As shown in FIG. 3b, every time the stack pointer location changes, a data object 314a, 314b, or 314c comprising a pair of entries is stored in the stack object file 310. The pair of entries comprise expected data characteristic containing information about a data element that is about to be stored in the stack memory. For example, a first entry of a pair may comprise a starting address of the data element that is about to be written to a stack memory and a second entry of the pair may comprise an ending address of the data element. It will be appreciated that by changing the location of the stack pointer, the system has not pushed anything into the stack memory (i.e., storing will happen subsequently) but rather has allocated memory space for a subsequent storage of the data element.

Once space is allocated within the stack memory, the ALU 304 determines an actual address of data to be accessed in the stack memory. The ALU may determine the actual address from an executed STORE instruction (or an arithmetic instruction operating on stack memory address with an objective of generating target memory address for an imminent STORE instruction), comprising an initial (base) address of data to be accessed. The actual address is provided to a violation detection element 308, which compares the actual address of data being accessed to the stored data objects 314a-314c containing data characteristics of a previously stored data element. If a memory access instruction accesses a non-stack location, there will be no stored data object in the stack object database. In such a case, there is no violation flagged by 308. If the data location is within a stored data object, there is no violation. However, if the data location is not within a stored data object, there is a violation.

Figure 4:
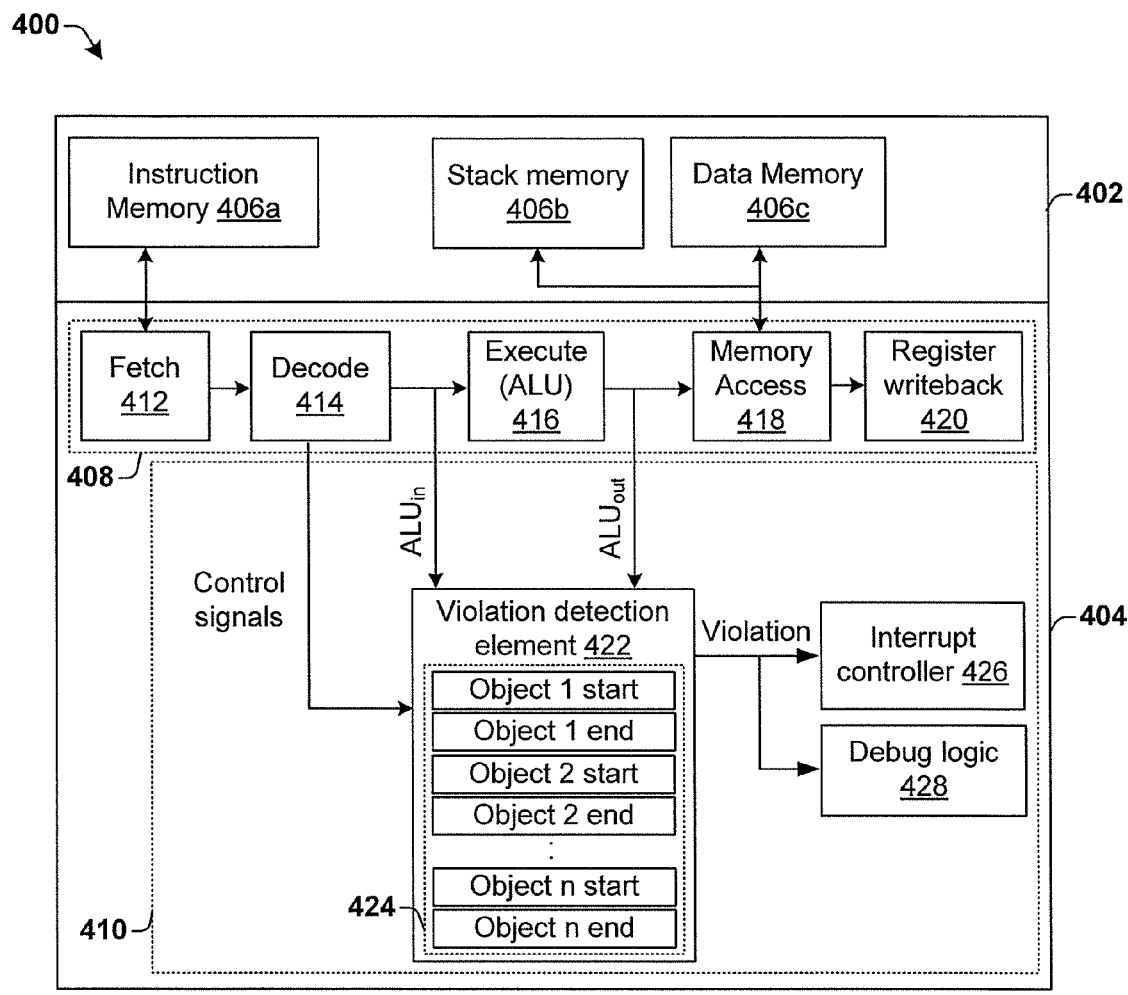
FIG. 4 is a block diagram of a computer system having a stack corruption detection system in accordance with some embodiments of the disclosed invention.

FIG. 4 is a block diagram of a computer system 400 having a stack corruption detection system in accordance with some embodiments of the disclosed invention.

The computer system 400 comprises a memory 402 and a processing unit 404. The memory 402 comprises one or more types of memory including, instruction memory 406a, stack memory 406b, and data memory 406c. The memory 402 may also include other types of memory, such as heap memory, for example.

The processing unit 404 comprises a datapath (pipelined or non-pipelined) 408 and a stack memory corruption detection system 410. The datapath 408 is configured to interact with the memory 402. As shown in FIG. 4, the datapath 408 comprises a fetch unit 412 configured to fetch instructions from the instruction memory 406a. Generally, a fetched instruction is stored in an instruction register (not shown). In some embodiments, the datapath 408 may further comprise a memory access unit 418 and a register writeback unit 420. The memory access unit 418 comprises hardware configured to access stack memory 406b and data memory 406c. The register writeback unit 420 performs register operations such as storing to registers the results of instruction just executed.

The fetched instructions are provided to a decoder unit 414 configured to interpret or decode the instructions. The instructions may include at least one opcode and at least one operand. The opcode specifies an operation to perform (e.g., a POP or PUSH command), while the operand identifies data addresses to be manipulated or operated on. The decoder unit 414 provides the op code and operands as an input signal $ALU_{in}$ to an execute unit 416 comprising an arithmetic logic unit (ALU). The ALU performs arithmetic and logical operations on the operands (e.g., adding a base address of a first operand to an offset of a second operand) and generates an output signal $ALU_{out}$. For example, the ALU will perform the necessary arithmetic operations on the contents of a stack pointer register.

ALU input and output signals, $ALU_{in}$ and $ALU_{out}$, are fed to violation detection element 422. The output signal $ALU_{out}$ continues its journey in the datapath 408 and is eventually written back to the stack pointer register by the register writeback unit 420. If an instruction is decoded by decoder unit 414 as an arithmetic instruction with a stack pointer as an operand, the decoder unit 414 also generates one or more control signals that are provided to stack memory corruption detection system 410. The control signal(s) cause the stack memory corruption detection system 410 to pick up the input signal $ALU_{in}$ and output signal $ALU_{out}$ and to create an entry in stack object file/database 424.

In particular, the decoder unit 414 provides one or more control signals to a violation detection element 422 that a stack pointer location indicative of top of stack within stack memory 406b is being moved by the arithmetic operation, and that data is to be written to/read from the stack memory 406b. The violation detection element 422 is further configured to receive data comprising the input signal $ALU_{in}$ and the output signal $ALU_{out}$. The violation detection element 422 determines a memory range correspond to the change in stack pointer location from the input signal $ALU_{in}$ and stores a data object comprising a memory range within a stack object file 424. For example, if a first data element having a size of 25 bytes is to be pushed into stack memory 406b a data object comprising a first register holds the start address of the 25 bytes and the second register holds the end address of the 25 bytes.

The violation detection element 422 determines an actual address of data to be accessed from the output signal $ALU_{out}$. When the ALU 416 executes the memory access related instruction (e.g., a LOAD, STORE instruction, Arithmetic instruction operating on memory addresses) the violation detection element 422 determines if there is corruption by comparing the expected memory range of the data element stored in the stack object file 424 to the actual memory address requested by the memory access operation range. For example, when a STORE instruction comprising base address and offset is executed to update a data element in stack memory 406b, the violation detection element 422 compares a memory range of the data element recorded in the stack object file 424 to an expected address of the data element calculated by the ALU.

If the actual address to be accessed is not within the expected memory range, a violation signal is sent to an interrupt controller 426 and a debug logic 428. The interrupt controller 426 is configured to take an action in response to the corruption, while the debug logic 428 is configured to record the cause of the corruption. In this manner the memory corruption detection system 410 reviews the STORE, LOAD and arithmetic instructions operating on memory addresses.

It will be appreciated that some computer systems may comprise multiple modes of operation (e.g., Privileged, User, etc). In such computer systems, the different operating modes may utilize different stack memories. Accordingly, in some embodiments, the decoder unit is configured to provide a "mode" command to the violation detection element. The mode command indicates which of the various CPU modes is being used by the computer system.

Figure 5:
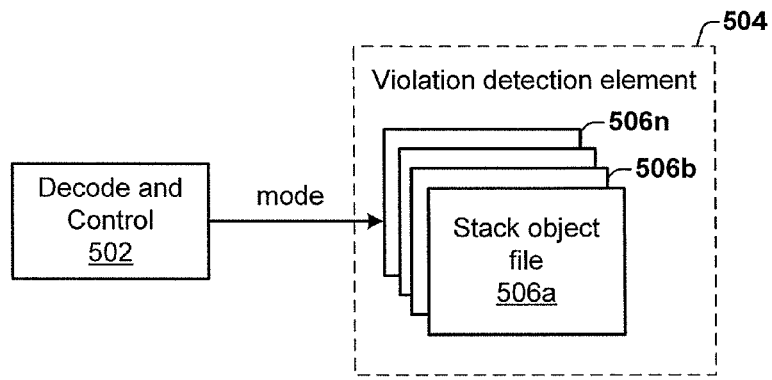
FIG. 5 is a block diagram of a computer system configured to operate in multiple modes of operation.

For example, FIG. 5 illustrates a block diagram of a computer system 500 configured to operate in multiple modes of operation (i.e., execution modes). A program procedure executed in one of the multiple modes of operation will have its local variables stored in a stack memory dedicated to that mode of operation. Every mode thus has a dedicated Stack Pointer Register to allow the computer system 500 to keep track of stack corruption for each of the CPU modes. The computer system 500 comprises a plurality of stack object files 506a-506n corresponding to the different operating modes.

During operation, a stack object file 506a, 506b, ... or 506n corresponding to a current mode of operation is selected by decode and control unit 502 since the decode and control unit 502 knows the current mode of operation. In particular, the decode and control unit 502 provides a "mode" signal to the violation detection element 504 to select a stack object file 506a, 506b, or 506n from the plurality of stack object files. The stack corruption detection unit may operate as described above, using the selected stack object file.

Figure 6A:
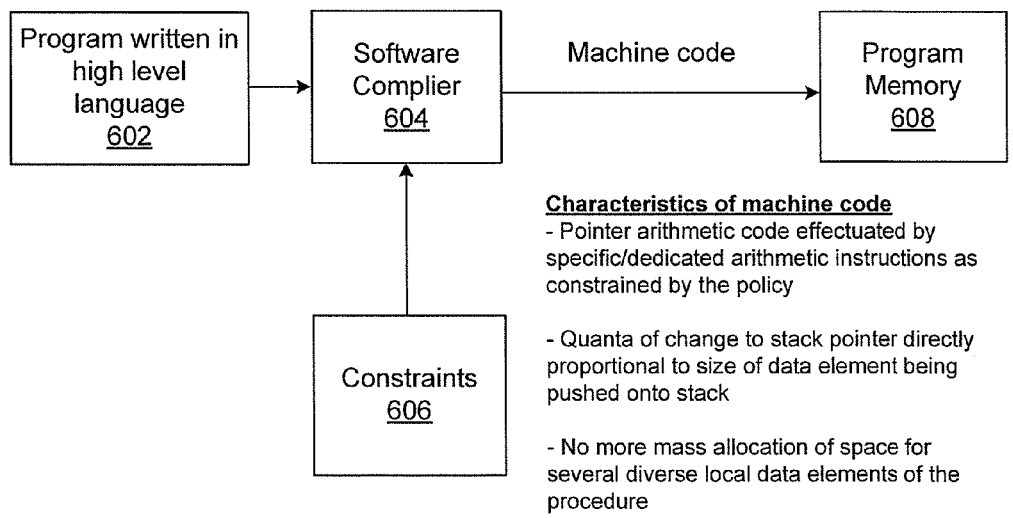
FIG. 6a is a block diagram of a computer system having a compiler subject to one or more constraints.

FIG. 6a is a block diagram illustrating a computer system 600 having a compiler 604 subject to one or more constraints. The compiler 604 is configured to convert a high level programming language 602 (e.g., such as "C", FORTRAN, etc.) to machine code that is stored in program memory 608. The machine code can subsequently be accessed in the program memory 608.

One or more constraints 606 are provided to the compiler 604. The constraints 606 are provided to the compiler 604 in manner that causes the generated machine code to have certain constraints within its instruction stream. By providing constraints to the compiler 604, the high level program does not require additional modification in order to work with the disclosed stack memory corruption detection system. Rather, the compiler 604 utilizes policy constraints in order to generate constrained machine instructions that are operable with a stack overrun detection system.

In particular, applying constraints to the compiler 604 allows it to change the way that it generates the PUSH and POP instructions, to a particular manner that allows for the sizes of data elements to be determined. In some embodiments, the constraints can prevent the compiler 604 from optimizing code. For example, typically an optimized machine code generated after compilation of source code, provides for a mass allocation of space in a stack memory for the storage of several diverse data elements of a procedure. However, by implementing a policy constraint that prevents the compiler 604 from optimizing code, the generated machine code incrementally allocates space in a stack memory for a single data element. In other words the policy constraint cause the compiler to generate machine code that updates the stack pointer on a per data element storage basis. For example, to write a 2 byte data element to a stack memory compiler 604 generates instructions that moves a stack pointer by 2 bytes. To write next a 4 byte data element to a stack memory, compiler 604 generates code that moves the stack pointer by exactly 4 bytes.

By constraining the compiler 604 to generate machine code that incrementally updates a stack pointer, the quanta of change to the stack pointer is made directly proportional to the size of the data element intended to be pushed into the stack. This allows for a relationship to be constructed between objects being stored in the stack memory and their sizes (e.g., by tracking the quanta of change applied on the stack pointer). For example, optimized code can subtract 32 bytes from a stack pointer, which is subsequently used for storing data elements having 4, 8, and 20 bytes. This causes a loss in the ability to determine the size of a data element. However, by applying a constraint that causes the compiler 604 to generate a constrained machine code that incrementally updates the stack pointer (e.g., allocating space to write n bytes by moving the stack pointer by n bytes), every time the stack pointer is moved, entries that are formed and/or adjusted in the stack object file.

It will be appreciated that additional constraints may also be applied to the compiler 604. For example, in some embodiments, the policy constraints may further comprise a constraint that the compiler 604 use specific instructions while dealing with pointer arithmetic. The constraint is that instructions meant for pointer arithmetic require an operand that contains the memory address, which can then be routed to a stack object filed during run time.

It will be appreciated that in the method and apparatus provided herein PUSH and POP commands are operated to perform separate and distinct actions of allocating space by adjusting the location of a stack pointer and actually storing data. Accordingly, for instruction set architectures wherein a single PUSH or POP instruction does both stack pointer decrement and STORE or READ, the disclosed compiler is constrained according to policy constrains to generate code in which the LOAD/STORE and stack pointer update instructions are separate (e.g., an arithmetic instruction to decrement stack pointer is performed first and a STORE instruction to actually store data is performed subsequently).

Figure 6B:
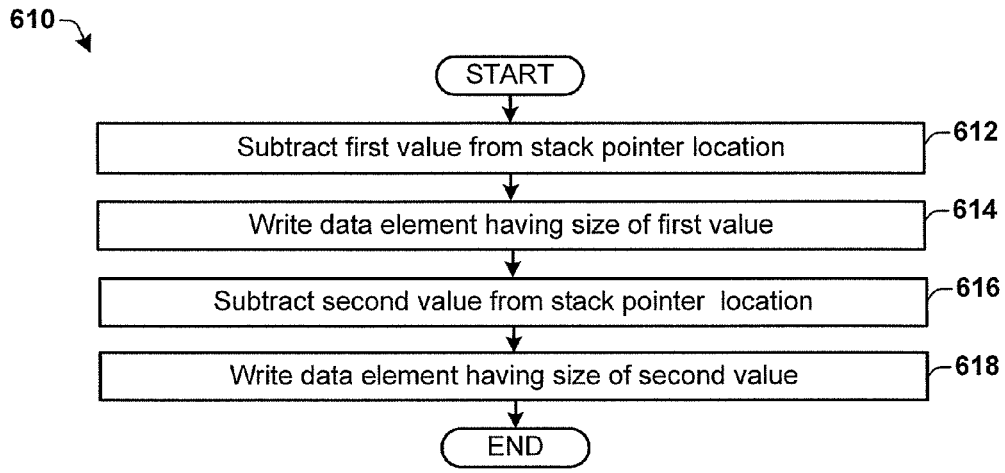
FIG. 6b is an exemplary method of incrementally updating a stack pointer by an amount that is directly proportional to the size of a data element to be pushed into a stack memory.

FIG. 6b illustrates an exemplary method 610 for incrementally updating a stack pointer by an amount that is directly proportional to the size of a data element to be pushed into the stack memory.

At 612 a first memory allocation is made by subtracting a first value from a stack pointer (top of stack). For example, a first value of 10 may be subtracted from a stack pointer, changing the stack pointer from 1000 to 990.

At 614 a first data element having a size of the first value is pushed into the stack memory. For example, a first data element having a size of 10 bytes is pushed into the stack memory, where it occupies memory locations 990 to 999.

At 616 a second memory allocation is made by subtracting a second value from a stack pointer location. For example, a second value of 8 may be subtracted from the stack pointer location, changing the stack pointer location from 990 to 982.

At 618 a second data element having a size of the second value is pushed into the memory stack. For example, a second data element having a size of 8 bytes is pushed into the stack memory, where it occupies memory locations 982 to 989.

Figure 7:
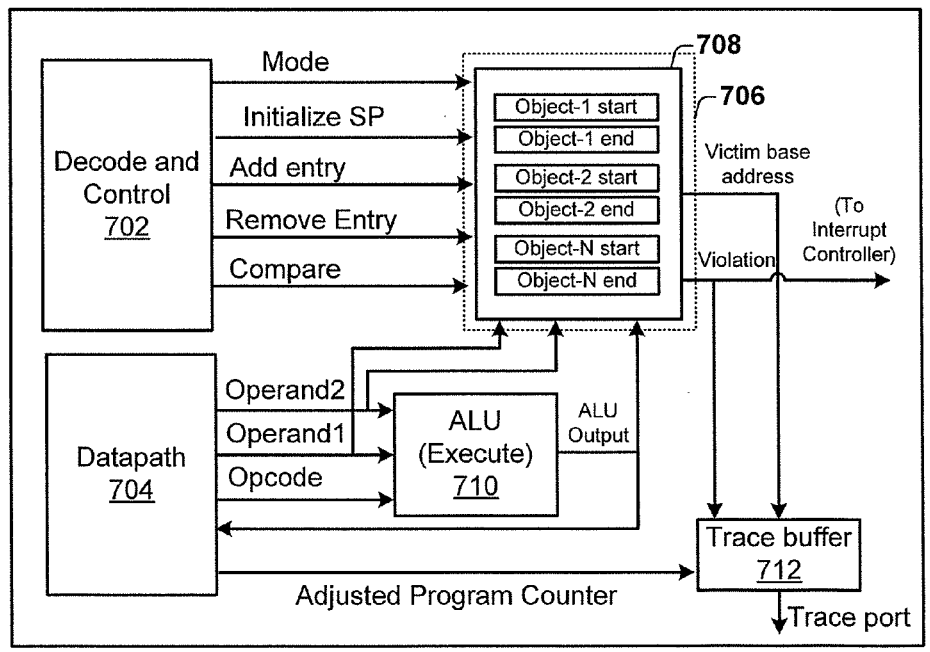
FIG. 7 is a block diagram of a computer system having a stack corruption detection system in accordance with some embodiments of the disclosed invention.

FIG. 7 is a block diagram of a computer system having a stack corruption detection system 700 in accordance with some embodiments of the disclosed invention.

The system 700 comprises a decode and control unit 702 configured to provide control signals to a violation detection element 706 comprising a stack object file 708. The control signals control the initialization, updating, and removal of stack object entries within the stack object file 708.

In particular, an "Initialize SP" signal is asserted when the decode and control unit 702 encounters a data movement command (e.g., decoded instructions comprising a data movement command to move or load data) with the Stack Pointer (SP) as the destination operand. An "Add Entry" signal is activated when a stack pointer is modified by means of an arithmetic instruction while a "Remove Entry" is activated when a stack pointer is modified in an opposite direction by means of an arithmetic instruction.

For example, in the case of a descending stack, upon receiving a simple instruction to write data to a stack pointer register (e.g., SUB SP, #8), the decode and control unit 702 will decode the instruction (e.g., SUB SP, #8). Because the decode and control unit 702 interprets this instruction as intent on the part of a program to allocate space within a stack memory, it provides a signal to the violation detection element 706 that adds an entry pertaining to space within the stack object file 708. To do this the decode and control unit 702 asserts an "Add Entry" signal. Similarly, the decode and control unit 702 would assert a "Remove Entry" signal if decode and control unit 702 received an instruction construed as stack unwinding (e.g., ADD SP, #8). The remove entry signal would cause violation detection element 706 to remove the last entry pair created within the stack object file 708. It will be appreciated that in some embodiments, the decode and control unit 702 can apply the principles of the above example for ascending stacks also.

The system 700 further comprises an ALU 710 configured to receive instructions comprising an opcode, and one or more operands from a datapath 704. The opcode specifies the operation to be performed (e.g., a POP or PUSH operation). The operands specify an address within a stack memory at which the operation is to be performed. In some embodiments, inputs to ALU 710 comprise a first operand (Operand1) denoting a base address location (location-X) within a stack memory, a second operand (Operand2) denoting a location offset (or index) from base address, and an op code, while outputs from ALU 710 comprise a second location (location-Y). The s second operand and the location offset are provided to the violation detection element 706. The violation detection element 706 forms an entry pair within the stack object file 708 based upon the received inputs. The entry pair comprises a first entry containing the starting address of the data element to be stored and the second entry stores an ending address of the data element to be stored based on Operand2.

For example, if Operand1 had a value of 2000 and Operand2 a value of 10 and an opcode denoting an arithmetic subtraction operation, ALU would output a value of 1990. Thus, inputs to violation detection element 706 are the values 1990 and 10. Stack object file 708 then forms an entry pair with first entry having a value 1990 and a second entry 1999. Address range inclusive of the two addresses 1990 and 1999 denote an address range of 10 locations.

If the decode and control unit 702 decodes an instruction comprising an arithmetic instruction operation on memory addresses (e.g., Add Address ADDSC.A instruction from Tricore™ instruction set) within a stack memory, the decode and control unit 702 is configured to assert a "Compare" signal. In various embodiments, a Compare signal is generated in response to an actual data access in stack (LOAD/STORE instruction). The compare signal indicates that the violation detection element 706 is to check a stack memory access for a violation by comparing the address of the memory access command with the entries stored in the stack object file 708. If the address of the memory access command is within a stored entry range, there is no violation. However, if the address of the memory access command is not within a stored entry range (e.g., if the memory access command is not restricted to the stored entry range), such an access is deemed as resulting in corruption.

For example, for an 8-byte data stored on a stack memory, an entry pair exists in stack object file 708 with a start address (location-X) of 2000 and an end address (location-Y) of 2007. When a subsequent store instruction is received, the ALU 710 calculates a memory address that is to be accessed. If an update is to be made to location 2006 (e.g., In Base plus Index addressing mode, an exemplary CPU register R1 contains the base address 2000 and an index of 6 is added to the base address to form a final address of 2006), the ALU 710 receives the content of exemplary register R1 as a first operand (address 2000), 6 as a second operand, and the op code of the store instruction. The ALU 710 then adds contents of exemplary register R1 and 6 and generates an address of 2006 which is passed as an output address to a memory access stage. Both 2000 and 2006 are also input into the violation detection element 706, which determines if it has any pair of entries with a start address of 2000. Upon finding such an entry pair, the violation detection element 706 compares 2006 with the end address of the entry pair. Since 2006 is less than the end address, the memory access is not in violation. In case of buffer overrun, R1+6 would have yielded a value of 2008 or greater, and the violation detection element 706 would detect a violation.

In the event of a stack memory violation, the violation detection element 706 is configured to generate a violation signal and the identified violated base address. In some embodiments, a violation signal is output to a trace buffer 712. The trace buffer 712 may also receive the identified corrupted stack location, and a program counter (i.e., address of instruction that caused the corruption) from datapath. Based upon this information, the trace buffer 712 provides the corrupted stack address and address of instruction causing corruption at a trace port output.

FIG. 8 is a diagram 800 illustrating exemplary high level programming code and corresponding operation of a stack object database 802 during PUSH (STORE) and POP (LOAD) operations.

The stack object database 802 is built by tracking the quanta of change that is applied on the stack pointer by arithmetic/logic instructions defined by the high level programming code. Once a stack object database 802 is formed, corruption can be detected by comparing the actual data characteristics of data elements being accessed with expected data characteristics of data elements available in the stack object database 802. For example, if a stack pointer is moved to allocate N data bytes in stack memory, an object is added to the stack object database 802 storing the starting and ending address of the N allocated data bytes.

Formation of the stack object database 802 begins with by activating the stack object file by means of "Initialize SP" signal (code line 804). The initialize SP signal indicates that an application wants to start using the stack by initializing the stack pointer. In some embodiments, the initialize SP signal is generated when a data movement or load instruction is received by the ALU. As soon as the stack pointer is initialized to a certain value at a first time (t=1), it is possible to start forming the stack object database 802 based on subsequent memory access instructions.

For example, before a second time (t=2) the stack object database 802 is empty and the stack pointer is at location 2000. At the second time, an arithmetic instruction is received to decrement the stack pointer by a value of 4 as a preparation to PUSH a first data element of size 4 bytes into a stack memory. Upon decoding this instruction, the decoder unit generates an "Add Entry" signal, which is provided to the ALU. The ALU further receives as input both the current stack pointer value (2000) and the value that is deducted from the former (4) and generates an ALU output signal therefrom. The output signal $ALU_{out}$ (1996) and input signal ALUin (4) are fed to violation detection element which creates an entry pair with 1996 as a starting address and 1999 as an ending address.

At a third time (t=3), an arithmetic instruction is received to decrement the stack pointer by a value of 1 as a preparation to PUSH a second data element of size 1 byte into the stack memory. Upon decoding this instruction, the decoder unit generates an "Add Entry" signal, which is provided to the ALU. The ALU further receives as input both the current stack pointer value (1996) and the value that is deducted from the former (1) and generates an ALU output signal therefrom. The output signal $ALU_{out}$ (1995) and input signal $ALU_{in}$(1) are fed to violation detection element which creates an entry pair with 1995 as a starting address and an ending address. Similar database changes are made at a fourth time (t=4) and at a fifth time (t=5).

At a sixth time (t=6), an arithmetic instruction to increment the stack pointer by a value of 2 is received. Upon decoding this instruction, the decoder unit generates a "Remove Entry" signal. The "Remove Entry" signal is provided to the violation detection element, which removes the entry created last. The stack pointer moves from location 1992 to 1994. Similar database changes are made at a seventh time (t=7), an eighth time (t=8) and a ninth time (t=9).

Figure 9:
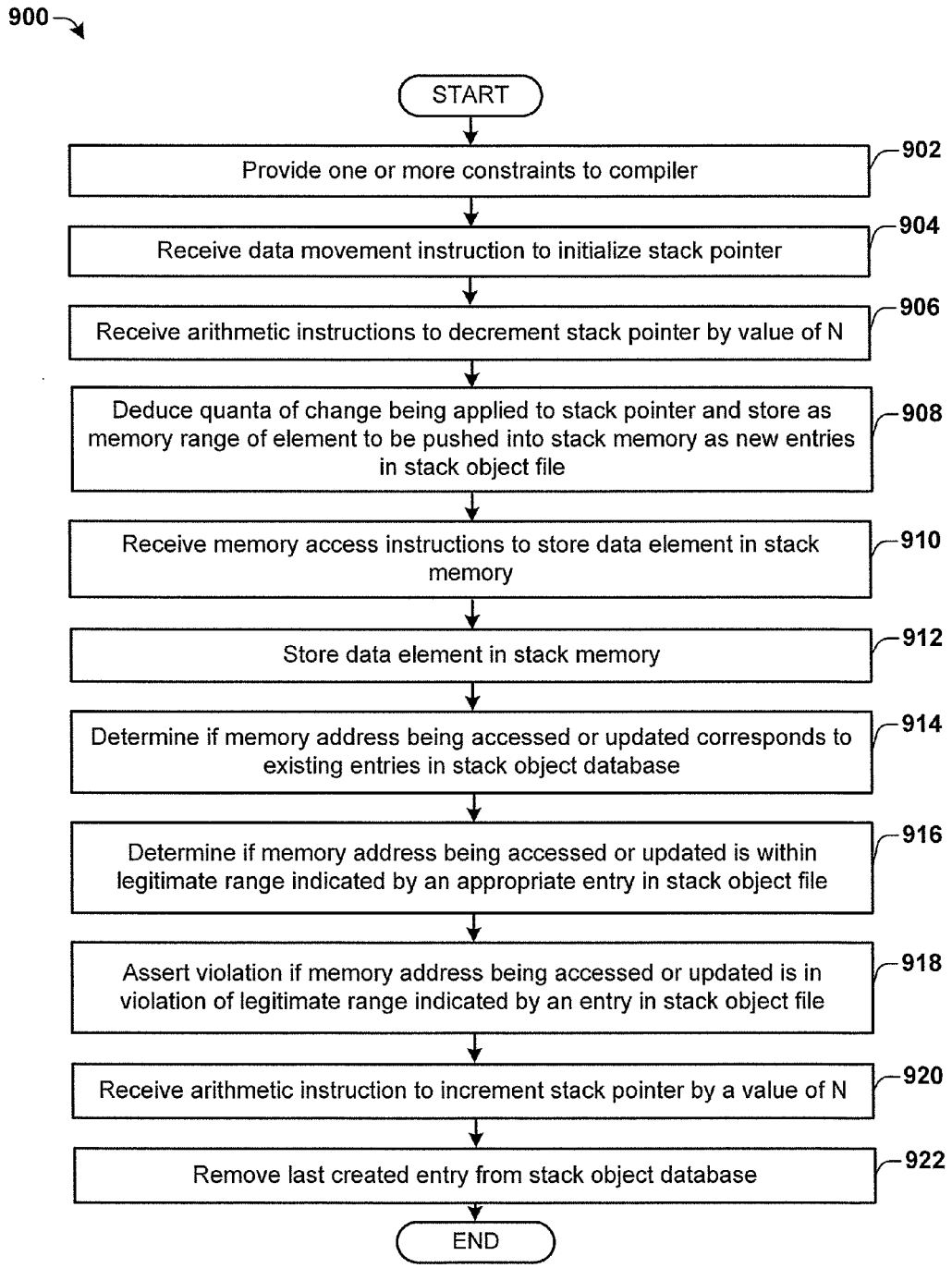
FIG. 9 illustrates a flow diagram of a method for detecting stack memory corruption.

FIG. 9 illustrates a flow diagram of a method 900 for detecting stack memory corruption due to buffer overrun and underrun errors.

It will be appreciated that while the methods disclosed herein (e.g., methods 200, 610, and 900) are illustrated and described as a series of acts or events, that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Furthermore, the disclosed methods may be implemented as a apparatus, or article of manufacture using standard programming and/or engineering techniques to produce software, firmware, hardware, or any combination thereof to control a computer to implement the disclosed subject matter (e.g., the circuits shown in FIG. 3a, 4, etc., are non-limiting examples of circuits that may be used to implement the disclosed methods). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

At 902 a constraint is provided to a compiler. The constraints constrains the compiler to incrementally modify stack pointer location within a stack memory. In some embodiments, the constraints may further constrain the compiler to use specific arithmetic instructions for memory address calculations.

At 904 the stack pointer is initialized upon receipt of a data movement instruction.

At 906 an arithmetic instruction is received to decrement a stack pointer by a value of N. The instructions are construed to result in imminent store operation.

At 908 a quanta of change being applied to stack pointer is deduced and a memory range of the element to be pushed into the stack is stored as new entries in a stack memory object database.

At 910 memory access instructions to store a data element in stack memory are received.

At 912 the data element is stored in stack memory.

At 914 the method determines if a memory address being accessed or updated corresponds to any of existing entries in the stack object database. For example, the method may determine if a starting address of an entry pair corresponds to a base address (e.g., a first operand) of a memory address to be accessed.

At 916 the method determines if a memory address being accessed or updated is within a legitimate range indicated by an appropriate entry in the stack object database. For example, the method may determine if an offset (e.g., a second operand) of the store command is within the second memory entry of the entry pair.

At 918 a violation signal is asserted if the memory address being accessed or updated is in violation of legitimate range indicated by an appropriate entry in the stack object database. For example, if an offset (e.g., a second operand) of the store command is not within the second memory entry of the entry pair, a violation is present.

At 920 an arithmetic instruction is received to increment a stack pointer by a value of N.

At 922 the last created entry is removed from the stack object database.

It will be appreciated that equivalent alterations and/or modifications may occur to those skilled in the art based upon a reading and/or understanding of the specification and annexed drawings. The disclosure herein includes all such modifications and alterations and is generally not intended to be limited thereby.

In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

What is claimed is:

1. A CPU having a stack corruption detection system, comprising:
   a stack memory configured to store a data element;
   a violation detection element configured to track changes to a stack pointer within the stack memory and to store an expected data characteristic corresponding to a quanta of change of the stack pointer as a data object within a stack object file;
   an arithmetic logic unit (ALU) configured to receive a stack memory access instruction and based thereupon to determine an actual data characteristic corresponding to the stack memory access instruction; and
   a pipelined or non-pipelined datapath, comprising a decoder unit configured to fetch a machine code from a program memory, to decode the machine code to determine the stack memory access instruction, to provide the stack memory access instruction to the ALU, and to provide a compare signal to the violation detection element upon receiving the stack memory access instruction, wherein the compare signal causes the violation detection element to compare the actual data characteristic to the expected data characteristic;
   wherein the ALU is configured to provide the actual data characteristic to the violation detection element, which compares the actual data characteristic with the expected data characteristic stored within the stack object file to determine if corruption will occur within the stack memory.

2. The CPU of claim 1,
   wherein the expected data characteristic comprises a memory range defined by a starting address and an ending address indicating the quanta of change in the stack pointer; and
   wherein the actual data characteristic comprises an address of a memory location attempting to be accessed by the memory access instruction.

3. The CPU of claim 2, wherein the stack object file is configured to store the expected data characteristic as an entry pair comprising a first entry having the starting address of the data element and a second entry having the ending address of the data element.

4. The CPU of claim 1, wherein the stack memory access instruction comprises an arithmetic instruction operating on a memory address within the stack memory.

5. The CPU of claim 1, further comprising:
   a compiler configured to compile a high level programming language to generate a machine code that is provided to a program memory, wherein the machine code is constrained to incrementally update the stack pointer on a per data element storage basis, such that a size of an allocated stack frame is equal to a size of the data element being written to the stack frame.

6. The CPU of claim 1, further comprising:
   a plurality of stack memories, respectively corresponding to different operating modes of the CPU; and
   a plurality of stack object files, respectively corresponding to the plurality of stack memories;
   wherein the decoder unit is configured to output a signal to the violation detection element indicating a current mode of operation.

7. A CPU having a stack corruption detection system comprising:
- a stack memory configured to store a data element according to an operation that uses a stack pointer to mark allocated stack frames;
- a compiler configured to compile a high level programming language to generate a machine code that is constrained to incrementally update the stack pointer such that a size of an allocated stack frame is equal to a size of the data element being written to the allocated stack frames;
- a stack object file configured to store a data object corresponding to an expected memory range of an element being accessed based upon a quanta of change being applied to the stack pointer, wherein the stack object file configured to store the expected memory range as an entry pair comprising a first entry corresponding to a starting address of the data element and a second entry corresponding an ending address of the data element;
- an arithmetic logic unit (ALU) configured to receive a stack memory access instruction and based thereupon to determine an actual memory address attempting to be accessed; and
- a violation detection element configured to retrieve the expected memory range from the stack object file and to compare the actual memory address to the expected memory range, wherein if the actual memory address is within the expected range, a violation is not present.

8. The CPU of claim 7, wherein the stack memory access instruction comprises an arithmetic instruction operating on a memory address within the stack memory.

9. The CPU of claim 7, further comprising a pipelined or non-pipelined datapath, comprising:
- a decoder unit configured to fetch the machine code from a program memory, to decode the machine code to determine the stack memory access instruction, and to provide the stack memory access instruction to the ALU.

10. The CPU of claim 9, wherein the decoder unit is further configured to provide a compare signal to the violation detection element upon receiving the stack memory access instruction, wherein the compare signal causes the violation detection element to compare the expected memory range to the actual memory address.

11. A method for detecting stack corruption, comprising:
- determining a quanta of change of a stack pointer within a stack memory;
- storing an expected data characteristic corresponding to the quanta of change as a data object within a stack object file, wherein the expected data characteristic comprises a memory range defined by a starting address and an ending address indicating the quanta of change in the stack pointer;
- receiving a memory access instruction;
- determining an actual data characteristic corresponding to the memory access instruction, wherein the actual data characteristic comprises an address of a memory location attempting to be accessed; and
- comparing the actual data characteristic with the expected data characteristic stored within the stack object file to determine if a violation has occurred.

12. The method of claim 11, wherein the memory access instruction comprises an arithmetic instruction operating on a memory address within the stack memory.

13. The method of claim 11, wherein the expected data characteristic is stored within the stack object file as an entry pair comprising a first entry having the starting address of a data element and a second entry having the ending address of the data element.

14. The method of claim 11, wherein comparing the actual data characteristic to the expected data characteristic, comprises:
- determining if the address of the memory location attempting to be accessed corresponds to an existing entry within the stack object file;
- determining if the address of the memory location attempting to be accessed is within a range defined by an appropriate entry in the stack object file; and
- asserting the violation if the address of the memory location attempting to be accessed is not within the range by the appropriate entry.

15. The method of claim 11, further comprising:
- constraining a compiler to generate a machine code from a high level programming language, wherein the machine code is constrained to incrementally update the stack pointer on a per data element storage basis.

16. The method of claim 15, wherein incrementally updating the stack pointer on a per data element storage basis, comprises:
- allocating a stack frame within the stack memory to have a particular size by setting a stack pointer location within the stack memory; and
- writing a data element having the particular size to the allocated stack frame.

* * * * *